J. G. ROTH.
Slop-Pail.
No. 126,648.
Patented May 14, 1872.
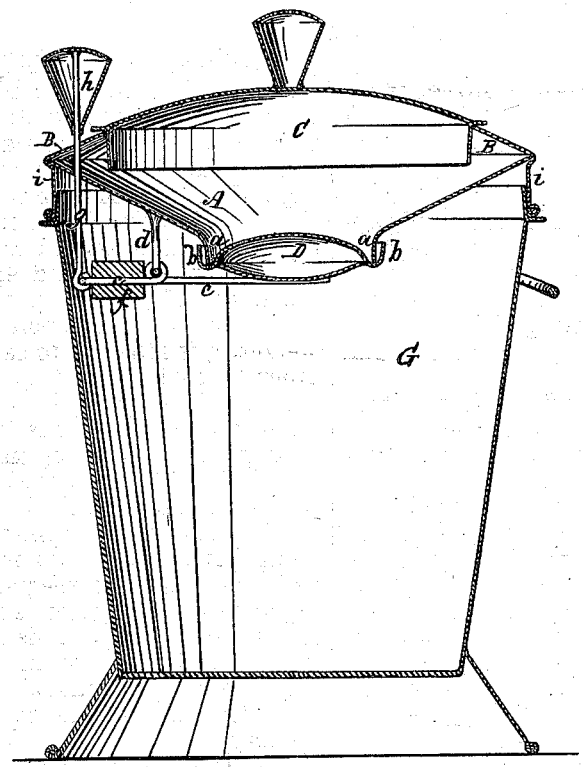
Witnesses
C. B. Nottingham
H. W. Throckmorton
Inventor
Jno. G. Roth by
atty A. Pollok

126,648

UNITED STATES PATENT OFFICE.

JOHN G. ROTH, OF NEW YORK, N. Y.

IMPROVEMENT IN SLOP-PAILS.

Specification forming part of Letters Patent No. 126,648, dated May 14, 1872.

*To whom it may concern:*

Be it known that I, JOHN G. ROTH, of the city, county, and State of New York, have invented certain new and useful Improvements in Slop-Pails, of which the following is a specification:

My invention consists in certain improvements, hereinafter described, which are principally applicable to slop-pails provided with covers having counterbalanced stench-traps, for the purpose of confining the stench or odor of the matter contained in the slop-pail within the same.

The drawing accompanying this specification represents a vertical central section of a slop-pail made in accordance with my invention.

The body A of the pail is of any ordinary or suitable construction. The top of the pail is closed by a removable cover carrying the stench-trap, and consisting of the conical cover proper A, having a hole in its center, the sides of which are formed into a downwardly-projecting rim, $a$, which extends downward vertically, or nearly so, a suitable distance, in order to enter the annular groove or water-seal of the stench-trap.

Around the upper edge of the conical or dished cover A is an overhanging annular flange, B, arranged as shown, which, when liquid matter is poured into the slop-pail, will turn back any of the liquid which is inclined to run up on the cover A, and will thus prevent it from accidentally escaping from the pail. The opening inclosed by this annular flange is closed by a cover, C, which tightly seals the slop-pail when the latter is not in use. This overhanging lip or flange is of value with a cover thus provided with a trap, as in case the trap should not move from any cause with sufficient freedom and quickness to permit the instant discharge of the liquid, any accumulation of the liquid on the cover from this cause will be prevented from washing up over the edge of the cover and escaping from the pail. Below the opening in the center of the dished cover A is a hinged trap, D, the upper face of which is made convex to prevent any liquid being retained by it. Around the edge of the trap is a concave rim or a grooved plate, $b$, into which, when the trap is up in position, the lower edge of rim $a$ enters. This rim $b$ is so constructed as to always retain a small quantity of water, which will suffice to seal the opening and prevent the escape of any stench from the body of the pail. The trap or valve is carried by one or more arms or rods, $c$, hinged or pivoted to a support, $d$, attached to and extending from the under side of cover A, and on the other side of the hinge or pivotal point a counter-balance weight, $f$, is attached to said arm or arms, in order to hold up the trap or valve when water is not being poured into the pail. To the outer end of the rod $c$ is linked or hinged a stem, $g$, which passes up through cover A and flange B, and is provided at its upper end with a handle or knob, $h$. This handle is of considerable value, inasmuch as the trap by its agency can be drawn down at any time, so as to discharge into the pail any matter resting on it which may not be of sufficient weight to depress the trap. This matter can thus be got rid of without pushing directly on the trap or adding additional weight, whether of water or other substance, in order to open the trap.

The cover A, in the present instance, is provided with an annular rim, $i$, encircling the sides of the pail at the top; but it may also be made to fit within the pail.

Having described my invention, what I claim, and desire to secure by Letters Patent, is—

1. A cover for slop-pails, composed of a dished or conical cover proper, with an opening for escape of liquid into the pail below, and an overhanging lip or flange for preventing the upward escape of the liquid poured upon the cover, substantially as shown and set forth.

2. The combination of the dished cover, the overhanging lip or flange, and a counterbalanced stench-trap closing the opening in said cover, substantially as shown and set forth.

3. The combination of the cover and its counter-balance stench-trap with the stem or handle for operating the same, substantially as shown and set forth.

4. The stench-trap or valve, constructed as herein described, with a convex or bulging portion fitting within the opening in the cover, surrounded by a groove or channel to receive the lower edge of the rim around said opening in the cover.

5. The combination of the dished cover, through which the liquid or other matter passes into the pail, the overhanging lip or flange, and the upper cover or lid fitting said flange, substantially as shown and set forth.

The above specification of my invention signed by me this 6th day of April, 1871.

JOHN G. ROTH.

Witnesses:
G. BISCHOFF,
E. LESLIE.